No. 703,063. Patented June 24, 1902.
F. F. HAWKINS.
DENTAL BUR.
(Application filed Nov. 3, 1900.)
(No Model.)
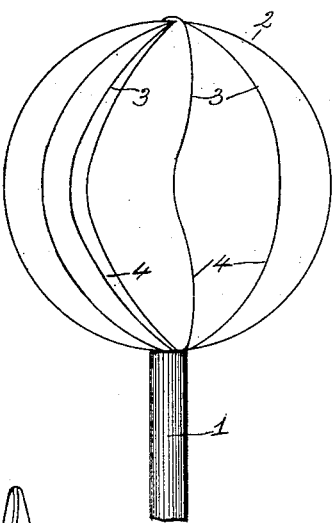
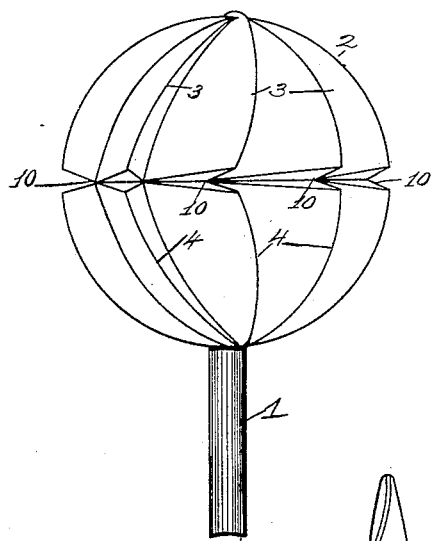
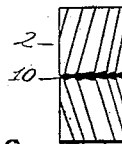
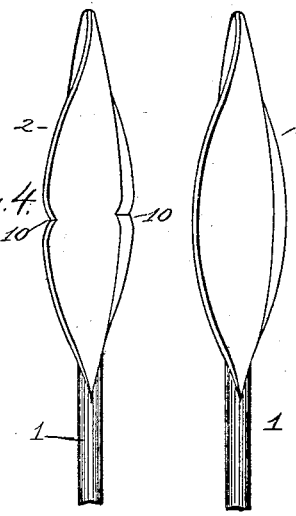
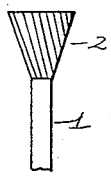
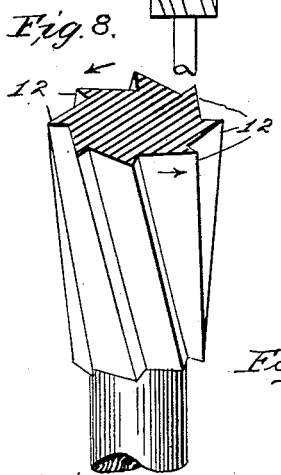
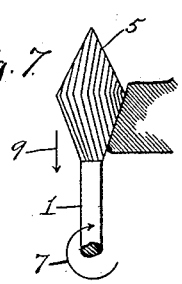
Witnesses:
E. M. O'Reilly
J. G. Curtis
Inventor:
Frank F. Hawkins
By Mosher & Curtis
Attys.

UNITED STATES PATENT OFFICE.

FRANK F. HAWKINS, OF TROY, NEW YORK.

DENTAL BUR.

SPECIFICATION forming part of Letters Patent No. 703,063, dated June 24, 1902.

Application filed November 3, 1900. Serial No. 35,361. (No model.)

*To all whom it may concern:*

Be it known that I, FRANK F. HAWKINS, a citizen of the United States, residing at Troy, county of Rensselaer, and State of New York, have invented certain new and useful Improvements in Dental Burs, of which the following is a specification.

The invention relates to such improvements; and it consists of the novel construction and combination of parts hereinafter described and subsequently claimed.

Reference may be had to the accompanying drawings, and the reference characters marked thereon, which form a part of this specification.

Similar characters refer to similar parts in the several figures.

Figure 1 of the drawings is a view in side elevation of a dental bur embodying my invention. Fig. 2 is a similar view illustrating other features of the invention. Figs. 3, 4, 5, 6, and 7 are similar views of rotary cutting dental tools severally containing my invention. Fig. 8 is a view, on an enlarged scale, in perspective, partly in section, of an inverted-cone dental tool containing my invention.

The principal object of my invention is to provide a rotary cutting-tool with cutting edges so formed that the tool will be drawn to its work when brought into engagement therewith by either a push or pull.

My invention is applicable to various forms of rotary cutting-tools, but is more particularly adapted for rotary cutting dental tools, such as burs and the like, and in the drawings I have shown the invention applied to such dental tools, in its application to which the invention will be particularly described.

In the manufacture of rotary shear cutting-tools, such as dental burs, as heretofore practiced the head of the tool has been formed with one or more cutting edges extending in the same direction from the shank end of the head forwardly to the outer end thereof in an incline or spiral, a shear cutting edge being thus formed. It will be readily understood that a cutting edge thus formed tends to draw the tool to its work, when the tool is caused to engage its work by a pushing movement of the shank. When such a tool is caused to engage its work by a pulling movement of the shank, which causes the shank side of the head to engage the work, the inclination of its cutting edges will be such as to tend to force the head away from its work, causing the cutting edges to act with greatly-impaired force.

In carrying out my invention I provide the head on its shank side with cutting edges which incline forwardly as they approach the shank end and are thus adapted to draw the head to its work when operated by a pulling movement of the shank.

In Fig. 1 I have shown a round dental bur comprising a shank 1 and a head 2, fixed thereon and provided with a plurality of cutting edges 3, each inclined forwardly from the equatorial portion of the head toward its outer end and a like plurality of cutting edges 4 each inclined forwardly from the equatorial portion of the head toward its shank end. These cutting edges may be so arranged that each of the edges 3 shall form a continuation of one of the edges 4, a continuous cutting edge being thus formed which changes its direction at the equatorial part of the head. It will be seen from an inspection of Fig. 1 that when such a tool is presented to its work by a pulling movement of the shank the cutting edges 4 on the shank side of the head will be caused to engage the work under exactly the same conditions as the edges 3 are caused to engage the work when the tool is presented to its work by a pushing movement of the shank, and in either case the inclination of the cutting edges while at work imparts a thrust to the tool in the direction of its work, thus causing the tool to be drawn to its work when operated either by a push or pull.

The difference in operation between the tools of this class embodying my invention and those heretofore constructed will be very clearly apparent from an inspection of Fig. 7 of the drawings, a double-cone bur 5 embodying my invention being shown with its shank side presented to the work. The bur being rotated in the direction of the arrow 7, a thrust will be imparted to the bur in the direction of the arrow 9, which tends to draw the bur to its work. The cutting edges on the outer end of this bur are substantially like those heretofore constructed and operate in the usual manner when applied by a pushing movement of the shank.

In Figs. 1, 2, 3, 4, 5, and 7 burs embodying my invention are shown each having a head convergent toward the shank and having thereon cutting edges inclined forwardly toward the shank, as above described, the tool shown in Fig. 5 being an inverted cone adapted only for operation by a pulling movement of the shank.

In Fig. 6 my invention is shown applied to a cylindrical form of rotary cutting-tool.

In Figs. 2, 4, and 6 I have shown the tool-heads each provided with a cutting edge inclined forwardly toward its outer end and a cutting edge inclined forwardly toward its shank end, said cutting edges being separated by a clearance-space 10 to afford an escape for the cuttings of the instrument.

My invention is applicable to various forms of rotary cutting-tools adapted to be presented to the work by a pulling movement, and my improved instrument is particularly adapted for use in dental work, where it is frequently impossible to introduce and properly apply by a pushing movement a rotary cutting instrument to its work.

It is a common experience in dentistry for a drill or bur to become so heated in forming a cavity either in the natural or artificial substance of the tooth as to render the withdrawal of the instrument very difficult and sometimes almost impossible. In many cases where a drill has been so introduced into a metal filling in a tooth the efforts to remove the drill have resulted in loosening or removing the filling itself, for the reason that as such instruments have heretofore been constructed the shank side could be held to its work only by a very considerable pulling force exerted through the shank, and it was thus impossible to cause the drill to work its way out of the cavity without exerting a dangerous strain upon the filling and tooth. Reversing the rotary movement in such a case is of little value, as the cutting edges do not face the work when rotated in the reverse direction.

In the use of my improved instrument in such a case it is only necessary to gently pull the same to its work, whereupon the cutting edges operate in the manner above described to draw the instrument to its work and there is no material pulling strain exerted upon the tooth or filling as the instrument cuts its way out of the cavity.

By the term "inclined" as applied above to the cutting edges I refer to the inclination of a cutting edge relatively to a radial plane intersected by such edge, and by the term "forwardly" I refer to the direction in which the cutting edge is moved to its work by the rotary movement of the tool or the direction in which the cutting edge faces.

In the application of my invention to an inverted-cone form of instrument, as shown in Fig. 5, it will be seen that the direction of inclination of the cutting edges is such that in use the cuttings formed by the instrument are forced by the screw movement of such edges toward the outer end of the instrument instead of toward the shank, as in the previous constructions. The cuttings are thus carried away from the work and can freely escape from the instrument at its outer larger end instead of, as in previous constructions, being carried toward the work and toward the smaller end, whereat the shank prevents their escape.

A preferred form of cutting edge for the tools above described is clearly shown in Fig. 8, the teeth 12, forming such cutting edges, being in cross-section similar in form to ratchet-teeth and being outlined on the forward side by an approximately radial line and on the rear side by a line forming an acute angle with said radial line, the teeth so formed presenting cutting edges to the work when rotated in one direction only and when rotated in the reverse direction presenting to the work only the beveled or inclined back surfaces of the teeth.

What I claim as new, and desire to secure by Letters Patent, is—

1. A rotary cutting-tool comprising a shank, and a head convergent toward said shank, and provided on said convergent portion with a cutting-tooth presenting a forwardly-facing cutting edge and a rearwardly-beveled back, said cutting edge being inclined forwardly toward its shank end, substantially as described.

2. A rotary cutting-tool comprising a shank and a head having thereon cutting edges oppositely inclined relatively to the axis of the head, one forwardly toward the shank end and another forwardly toward the outer end of the head.

3. A rotary cutting-tool comprising a shank and a head having thereon a cutting edge inclined forwardly toward its outer end and a cutting edge inclined forwardly toward its shank end said cutting edges being separated by a clearance-space at right angles to the axis of the head, substantially as described.

In testimony whereof I have hereunto set my hand this 1st day of November, 1900.

FRANK F. HAWKINS.

Witnesses:
FRANK C. CURTIS,
E. M. O'REILLY.